May 8, 1934.　　　　A. J. HOLMAN　　　　1,957,457
OPTICAL RECTIFYING SYSTEM FOR MOVING PICTURE PROJECTORS AND CAMERAS
Filed April 4, 1930　　　3 Sheets-Sheet 1
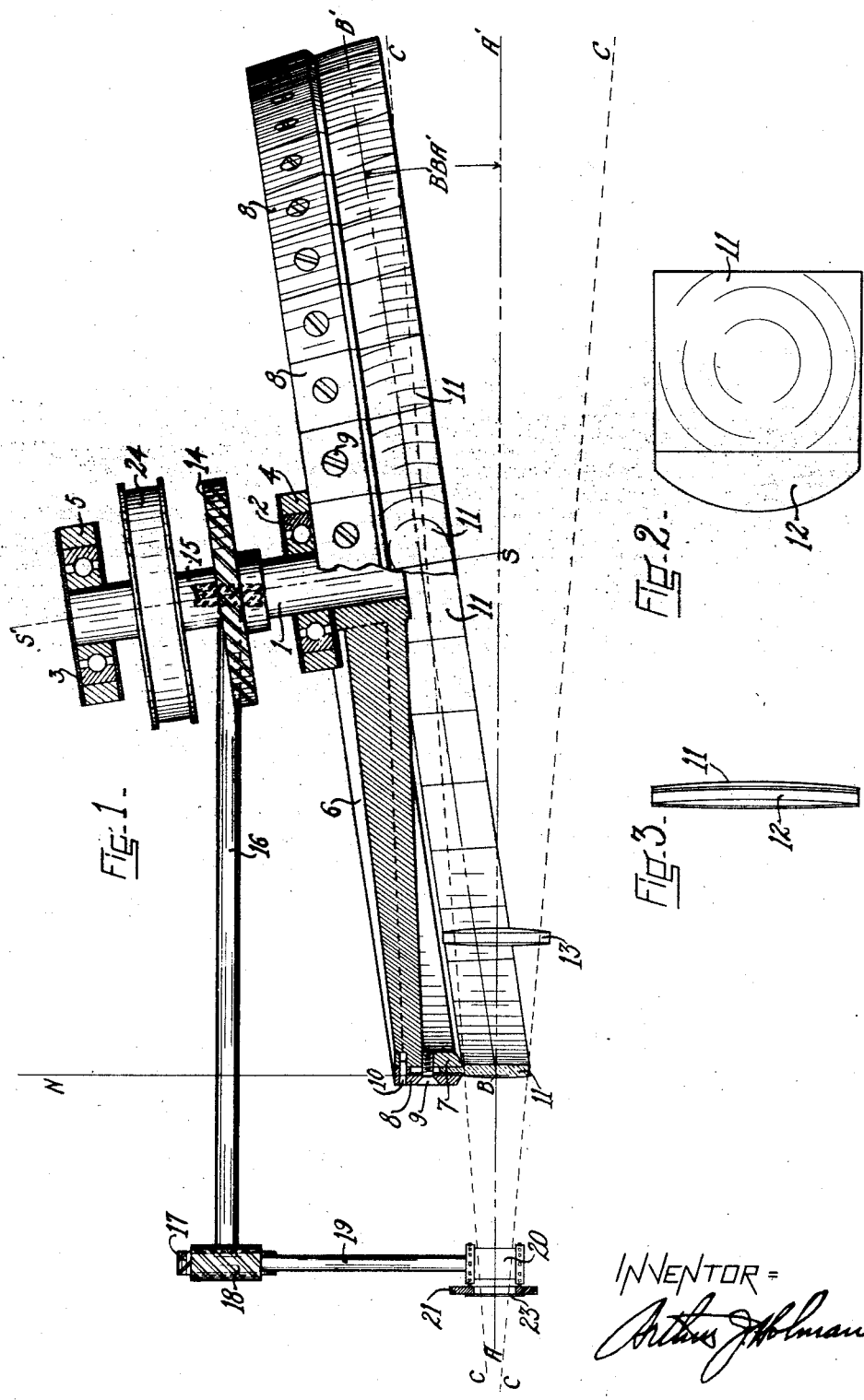

May 8, 1934.  A. J. HOLMAN  1,957,457
OPTICAL RECTIFYING SYSTEM FOR MOVING PICTURE PROJECTORS AND CAMERAS
Filed April 4, 1930   3 Sheets—Sheet 2

INVENTOR=

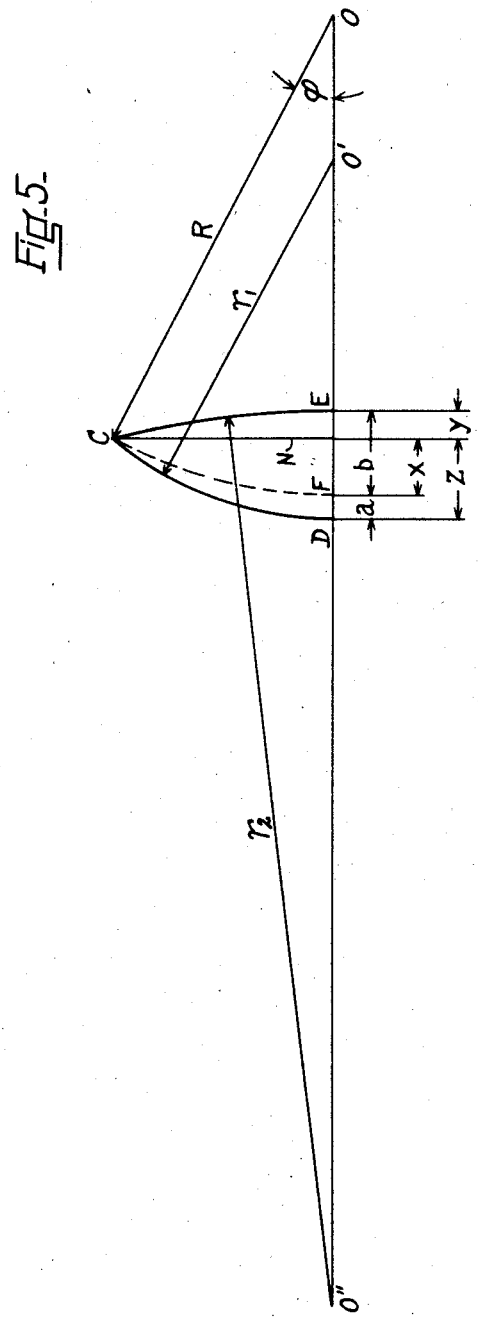

Patented May 8, 1934

1,957,457

UNITED STATES PATENT OFFICE 1,957,457

OPTICAL RECTIFYING SYSTEM FOR MOVING PICTURE PROJECTORS AND CAMERAS

Arthur J. Holman, Brookline, Mass.

Application April 4, 1930, Serial No. 441,657

12 Claims. (Cl. 88—16.8)

My invention relates to that type of projecting apparatus, or camera, wherein the film strip is kept continuously in motion and the effect of said motion is so compensated by means of moving optical rectifying elements as to produce a well defined image. It has been the special object of my invention to provide a simplified optical rectifying means comprising a stationary element and a single rotating wheel having a plurality of identical rectifying elements disposed about its periphery. In my improved device the single rotating lens wheel is so formed and so positioned and oriented with respect to the stationary element as to permit the direct passage of light from the condenser system to the screen, thus eliminating the necessity for reflectors; moreover, with this geometrical arrangement, a very close approach to the mathematically correct path of travel of the rectifying elements is attained with a relatively small diameter orbit, thus providing an extremely accurate rectifying system of reasonable over-all proportions.

The optical rectifying system described in U. S. Patent No. 1,584,098, when properly designed, has very slight inherent residual errors, but a precise gear train is required to operate the two rotating lens wheels in exact synchronism and in proper timed relation to the movement of the film strip across the aperture plate. My present invention, by substituting one lens wheel for two, simplifies the mechanical structure and eliminates entirely the problem of the synchronizing of rectifying elements, thereby reducing greatly the imperfections in the screen image caused by imperfect gears. In my improved device the precise gear train is reduced to the minimum, including merely the gears required to operate the aperture unit sprocket in synchronism with the single lens wheel. The single lens wheel design, because of its simplicity and compactness, is especially adapted for use in a camera.

My device may be best understood by reference to the accompanying drawings in which, Fig. 1 is an elementary plan view of the optical rectifying system showing the lens wheel with a section broken away, the stationary optical element, the aperture unit sprocket and its operating mechanism.

Fig. 2 is an enlarged plan view of a rectifying lens element.

Fig. 3 is an edge view of the same element showing the shape of the portion clamped between the lens wheel flanges.

Figure 4:
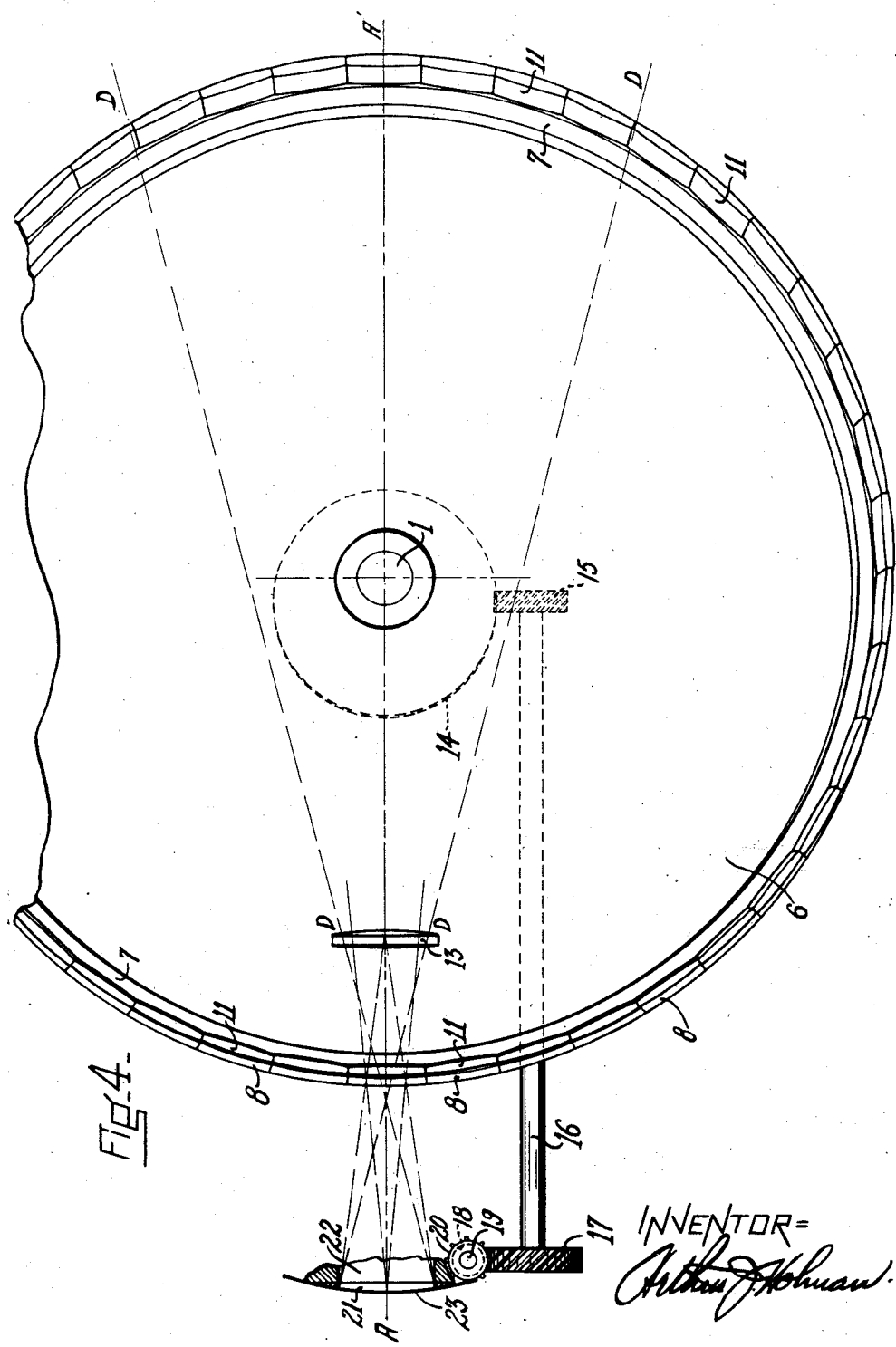
Fig. 4 is an elementary elevation of the optical rectifying system from the operating side, showing the lens wheel, the stationary optical element, a portion of the aperture unit, the aperture unit sprocket and its operating mechanism.

Fig. 5 is a geometrical figure from which data is obtained for calculating the relative curvatures of the refracting surfaces of the lens wheel elements. In the figure, $O''O$ represents the optical axis of the lens. The curvature of the outer refracting surface is represented by the arc CD at $O'$ and raving radius $r_1$. The curvature of the inner refracting surface is represented by the arc CE centered at $O''$ and having radius $r_2$. The arc CF centered at O, and having radius R, passes through the point of intersection of the arcs representing the inner and outer refracting surfaces, and also through the point F, which represents the optical center of the lens. R is the radius of the circle whereon the optical centers of the lens wheel elements are positioned when the lenses are mounted on the lens wheel. The point O lies on the axis of the lens wheel. N is the normal dropped from C to the optical axis $O''O$. $\phi$ is the angle $COO''$.

Referring now more specifically to the drawings, in which like reference numbers indicate like parts, 1 is the lens wheel shaft which is journaled in ball bearings 2 and 3 (Fig. 1) supported in housings 4 and 5 respectively, the housings being mounted on a suitable mechanism bed plate. The lens wheel 6 is press fitted on one end of shaft 1 and is provided with an integral peripheral flange 7 having an outer surface corresponding to the surface of a frustrum of a cone, the apex of the cone lying on the extended axis of the lens wheel shaft 1. Each flange section 8, which is pressed toward the flange 7 by a screw 9 and aligned by a dowel pin 10, together with the adjacent portion of the flange 7, forms a vice-like clamp for supporting and fixing the position of a rectifying lens element 11. The lens elements 11 (Figs. 2 and 3), which have spherical surfaces, are each contoured, on three sides, to fit into the general conical construction, the fourth side being provided with a projecting portion 12 which is ground to the proper curvature to exactly fit into the above described vice-like clamp. A thin paper padding is provided between glass and metal surfaces to equalize inequalities in the surfaces and also to act as heat insulators, thus reducing the possibility of breakage in assembling and in subsequent service.

Each element 11, is so surfaced and contoured (Fig. 2) that its optical center lies on a straight line joining the geometrical centers of its refracting surfaces; i. e., the optical axis of each lens element passes normally (i. e., at right angles) through each refracting surface at its geometrical center. In other words, the refracting surfaces are substantially symmetrical about the optical axis of the lens element. The geometrical symmetry is perfect except for the fact that a pair of edges are made slightly convergent in order that the lens may fit closely into the conical structure of the complete lens wheel. To facilitate manufacture, the projecting portion 12, (Fig. 3) of a lens element 11, is so proportioned and shaped as to lie wholly within the space enclosed by extending the spherical refracting surfaces, thus permitting free movement of the lap and polisher in generating these surfaces. The clamping surfaces of the projecting portion 12, are ground while the otherwise-completed lens element is held in a fixture, thereby insuring perfect seating and correct angular positioning of the lens element when it is finally clamped in position on the lens wheel.

The stationary optical element 13, of the rectifying system, is suitably mounted on the optical axis of the instrument, and, together with the co-acting rectifying lens elements 11, comprises the complete objective system. The general nature and characteristics of the stationary element 13, which is the front component of the objective system, are fully disclosed and described in my co-pending patent application Serial No. 427,036, filed February 8, 1930. The element 13, is preferably a high grade cemented triplet consisting of a symmetrical crown between two non-symmetrical flint lenses. In order that the complete objective may be achromatic, it is necessary that the element 13 be chromatically over-corrected to compensate the effect of the co-acting rectifying lens elements 11, which are, per se, uncorrected. The general laws governing the objective system are given, in the form of formulæ, in the above-mentioned co-pending application and it is to be understood that the stationary element 13, and the co-acting lens elements 11, must satisfy the fundamental laws of this type of optical rectifying system. Inasmuch as the present application deals primarily with the general structure of the revolving lens wheel rather than with the detail design of the element 13, further data thereon does not properly fall within the scope of the present application and will therefore be omitted.

Fast mounted on the lens wheel shaft 1 is helical gear 14 which meshes with helical gear 15 fast mounted on shaft 16. Fast mounted on the other end of shaft 16 is helical gear 17 which meshes with a helical gear 18 on aperture sprocket shaft 19. The aperture sprocket 20, fixed on the outboard end of shaft 19, is carried below the aperture unit, the position of which is indicated in Fig. 1 by the cross-sectioned aperture plate 21 and in Fig. 4 by the portion of the aperture unit 22. The film strip 23 overlies the aperture in the aperture plate 21. Power to operate the device is applied to the pulley 24 fixed on the lens wheel shaft 1.

Inasmuch as the detail construction of the mechanism does not enter into the present invention, I have not shown it in the drawings. It is to be noted, however, that the flexibility of the optical system to axial adjustment does not differ essentially from that described in U. S. Patent No. 1,584,098. It is also to be noted that the general construction and arrangement of the aperture unit described in my co-pending patent application Serial No. 304,977 filed September 10, 1928, is applicable to the herein described aperture sprocket drive, said co-pending application giving full details of a suitable framing mechanism in association with an axially adjustable aperture unit. The aperture unit consists essentially of a curved aperture plate, its axis of curvature being at right angles to, and in the horizontal plane with, the optical axis of the objective system. In order to fully satisfy the laws of the objective system, the aperture unit must be adjustable along the optical axis, said adjustment taking place in association with a similar axial adjustment of the front component 13, with respect to the revolving lens wheel elements 11.

The optical axis of the objective system is indicated by the dot and dash line A—A' (Figs. 1 and 4) and it will be observed that this axis passes through the center of the aperture in the aperture plate, through the optical center of the stationary optical element, and also through the optical center of each rectifying lens element in turn, as the lens wheel rotates, at the instant when such rectifying lens element is "centered" as indicated in the drawings. The axis S'—S of the lens wheel shaft and the optical axis A—A' lie in a common plane, hence the line B—B', joining the optical center of a rectifying lens element centered on the optical axis, with the optical center of the diametrically opposite lens element, also lies in the same plane. The angle B'BA' (Fig. 1) is the angle between the plane of the orbit of the optical centers of rectifying lens elements and the optical axis A—A'. Since a rectifying lens element, when centered on the axis A—A', must be normal thereto, it is evident that the angle B'BA' is equal to 90 degrees minus the angle S'SB formed at the intersection of the axis A—A' with the extended axis S'—S of the lens wheel shaft, and, therefore, angle B'BA' is equal to the angle formed at the intersection of the extended axis of the lens wheel shaft with the normal B—N to the optical axis A—A' drawn from the optical center of a centered rectifying lens element. In other words, the optical centers of all rectifying lens elements lie on the surface of a cone, the base of which is the plane of the orbit of said optical centers, the apex lying on the extended axis of the lens wheel shaft and the vertex angle being equal to twice the angle B'BA'.

The broken lines C—C (Fig. 1) represent the extreme limits, in the horizontal plane, of the light beam emanating from the objective and it will be observed that the angle B'BA' is just sufficiently large to allow a small clearance between the light beam and the forward edge of the lens wheel, thus permitting direct passage of light from the condenser system to the screen. The broken lines D—D (Fig. 4) indicate the extreme limits, in the vertical plane, of the light beam emanating from the objective.

The relative positions of the stationary component 13, and the operating zone of the co-acting rectifying lens elements 11, with respect to the aperture plate, are of prime importance in my improved objective system. It will be observed from the drawings, (Fig. 4) that the rectifying elements operate in the bundle of light rays at its most constricted cross-section, and this condition is necessary to minimize the inherent residual errors in the rectifying system. A special condenser system is required to satisfy this condition, namely, that the bundle of image-bearing rays will have a minimum cross-section at the operating zone of the rectifying elements. It will be noted that this operating zone represents the throat of my objective system and it is of the greatest importance to have this throat, or most constricted cross-section of the image rays, in reasonably close proximity to the aperture plate in order to use all the light available from the reflector arc which employs a very high angular aperture illuminating system. The secret of the exceptionally high light-transmitting efficiency and the very excellent over-all definition obtained with my improved objective system, lies in the fact that the rectifying elements operate in the light beam between the aperture plate and the stationary component of the objective system.

The rectifying lens elements, as previously stated, have spherical surfaces but the surfaces forming the outer periphery of the wheel have a shorter radius of curvature than the inner surfaces, the difference in curvature being the basis of a very accurate means for eliminating the inherent periodic variations which are a critical factor in the double lens wheel rectifying system. The curvatures of the inner and outer surfaces are so proportioned as to produce the equivalent of a straight line movement, normal to the optical axis, of the optical centers of the rectifying lens elements during the passage of said rectifying lens elements through the bundle of light rays which have traversed the film strip. The true orbit of the optical centers is a circle but proper proportioning of the curvatures of the rectifying lens surfaces will produce an effect equivalent to straight line movement normal to the optical axis, over the active range of the rectifying lens elements. To secure this effect it is necessary that the rectifying lens elements be bent to conform to the curvature of the circle whereon the optical centers of the rectifying lens elements are located in the lens wheel assembly. When these elements are so formed, there will be no appreciable shifting of the equivalent centers in a direction along the axis of the objective system as the various zones of the rectifying elements approach, pass over and recede from the optical axis of the system. This is especially true when the bundle of rays, transmitted by the condenser system through the film over-lying the aperture plate, has a small cross-section at the position where the rectifying lens elements operate.

The principle involved and the reason for bending the rectifying lens elements is easily seen on analyzing the effect produced by using symmetrical double convex elements. In any symmetrical lens, the optical center lies at the geometrical center and, for any zone removed from the optical axis, the bending effect may be considered to take place at a point mid-way between the refracting surfaces without serious error. When such a rectifying lens element is carried into operative position on the axis of the objective system by the rotation of the lens wheel, it is evident that the point, on the axis of the objective system, mid-way between refracting surfaces of the element as the edge of the element reaches the axis, will be nearer to the film position on the aperture plate than will be the optical center of the same rectifying element when the lens wheel has rotated sufficiently to position said optical center on the axis of the objective system. The same would be true for all zones of a symmetrical double convex lens because all of the points mid-way between its refracting surfaces lie on a line tangent to the circle on the periphery of which the optical centers of all the lens wheel elements are located, hence, the mid-way points, being further from the center of the revolving lens wheel, are closer to the film position on the aperture plate.

In the case of a plano-convex lens, the radius of the flat side is infinity and all refracting power resides in the curved side, hence the optical center lies on the optical axis at the curved surface. If such rectifying lens elements were used with the curved surfaces forming the outer surface of the lens wheel, the refracting power required in the lens elements would require a curvature much steeper than that of the circle of the optical centers on the lens wheel, hence it is apparent that, as the edge of such a rectifying element reached the axis of the objective system, the refracting surface of the rectifying element would be further from the film position on the aperture plate than would be the optical center of the same rectifying element as the optical center crossed the axis of the objective system. It is apparent that neither the symmetrical double convex nor the plano-convex will produce the desired effect, but, since they have opposite effects, it is evident that something between these two extremes is required to satisfy the requirement of no periodic movement of the optical centers of the rectifying lens elements along the axis of the objective system as these elements pass through the operative zone. A double convex element with one side somewhat steeper in curvature than the other is the solution, and it is a simple problem in trigonometry to bend a lens to conform to any desired curvature.

The values of $r_1$ and $r_2$ are derived mathematically in the following manner. Referring to Fig. 5, it is the purpose to so proportion $r_1$ and $r_2$ that the optical center F, and the point C at the intersection of the arcs CD and CE, will lie on the arc CF which is centered on the axis of the lens wheel and which has the radius R, equal to the distance from the axis of the lens wheel to the optical center of each lens wheel element.

The position of the optical center F, with respect to the refracting surfaces of a lens, is determined by the equation $$\frac{a}{b}=\frac{r_1}{r_2}$$

which provides the starting point for this derivation.

From the figure, $$a=z-x$$

and $$b=x+y,$$

therefore $$\frac{a}{b}=\frac{z-x}{x+y}=\frac{r_1}{r_2}$$

Also from the figure, $x=R(1-\cos\phi)$ $$y=r_2-\sqrt{r_2^2-N^2}=r_2-\sqrt{r_2^2-R^2\sin^2\phi}$$
$$z=r_1-\sqrt{r_1^2-N^2}=r_1-\sqrt{r_1^2-R^2\sin^2\phi}$$

Substituting these values for $x$, $y$ and $z$, $$\frac{r_1-\sqrt{r_1^2-R^2\sin^2\phi}-R(1-\cos\phi)}{R(1-\cos\phi)+r_2-\sqrt{r_2^2-R^2\sin^2\phi}}=\frac{r_1}{r_2}$$

Simplifying by the rules of algebra, the following general equation is obtained.

$$r_1^2-2r_1r_2\cos\phi+r_2^2=\frac{r_1^2 r_2^2}{R^2}$$

The refracting power of a thin lens is equal to the algebraic sum of the refracting powers of its refracting surfaces. If $f$ is the focal length of a lens, $$\frac{1}{f}$$

is its refracting power. The refracting power of a surface is inversely proportional to its radius of curvature, and directly proportional to the difference between the index of refraction of the material of the lens and that of the surrounding medium. If $n'$ is the index of refraction of the lens material, $n$ is the index of refraction of air, and $r_1$ and $r_2$ are the radii of curvature of the surfaces, we have the equation $$\left(\frac{1}{r_1}+\frac{1}{r_2}\right)(n^1-n)=\frac{1}{f}$$

letting $n'-n=c$, and solving for $r_2$ we obtain, $$r_2=\frac{r_1 cf}{r_1-cf}$$

Substituting this value of $r_2$ in the general equation and solving for $r_1$, we obtain $$r_1=\frac{cfR[R(1+\cos\phi)-\sqrt{2c^2f^2(1+\cos\phi)-R^2(1-\cos^2\phi)}]}{R^2-c^2f^2}$$

In a similar manner we obtain $$r_2=\frac{cfR[R(1+\cos\phi)+\sqrt{2c^2f^2(1+\cos\phi)-R^2(1-\cos^2\phi)}]}{R^2-c^2f^2}$$

It is of interest to examine the general equation $$r_1^2-2r_1r_2\cos\phi+r_2^2=\frac{r_1^2 r_2^2}{R^2}$$

If $\phi$ is reasonably small, say less than 8 degrees, we may substitute 1 for $\cos\phi$ without introducing serious error. Then we obtain $$r_1^2-2r_1r_2+r_2^2=\frac{r_1^2 r_2^2}{R^2}$$

and $$r_1-r_2=\pm\frac{r_1 r_2}{R}$$

Substituting value of $r_2$ in terms of $r_1$, $c$ and $f$, and solving for $r_1$, we obtain $$r_1=\frac{2Rcf}{R+cf}$$

likewise $$r_2=\frac{2Rcf}{R-cf}$$

These simple equations giving values of $r_1$ and $r_2$ in terms of $R$, $c$ and $f$, are satisfactory for preliminary calculations but, for mathematical accuracy, the more involved equations must be used in calculating the relative curvatures of the refracting surfaces.

A single lens wheel of the type used in a two lens wheel optical rectifying system, which is characterized by having all rectifying elements lying in a plane, cannot be used with a stationary optical element because of excessive lateral movement of the optical centers with any reasonable lens wheel diameter. A drum type lens wheel, which is characterized by having all rectifying elements lying on a cylindrical surface, requires the use of reflectors. If the image bearing rays are reflected it is necessary to use two reflectors in series in order that the screen image may not be reversed side for side. A conical construction, such as is described herein, not only possesses all the optical advantages of the double lens wheel type of rectifying system in that the moving rectifying elements may cut the bundle of light rays at its most constricted point, but also permits a much higher degree of correction. Furthermore this construction requires no reflectors, simplifies the mechanical structure, eliminates most of the gear problem, and lends itself admirably to a clean, open and convenient design.

It is to be noted that my single lens wheel differs from previously advocated single lens wheels in that each of my rectifying lens elements are identical and each rectifying element with its accompanying film frame, performs a complete picture cycle. This arrangement provides a very low peripheral velocity and consequently the lens wheel rotates very slowly for ordinary projection speeds. It also greatly simplifies the manufacture of rectifying lens elements and the lens wheel assembling operation.

In practice the lens wheel is enclosed in a dust proof case but, as such an enclosure involves no invention, I have not shown it on the drawings.

It is to be understood that rectifying elements other than lenses might be used to advantage on such a wheel as I have described, therefore my claims are intended to apply to all types of variable refracting elements arranged in such a conical formation.

The drawings, which are made to scale, illustrate a preferred rectifying system for a projector, comprising 42 rectifying lens elements, the equivalent focal length of the objective system being 6¾ inches. The diameter of the orbit of the rectifying lens elements is 23.36 inches and the focal length of the rectifying lenses and the front component of the objective is 11.73 inches. It is advantageous, particularly as regards distortion, to make the focal lengths of the components of the objective of the same order of magnitude. The axial distance from a rectifying lens element to the film strip overlying the aperture is 5 inches. The system is designed for use with standard 35 millimeter width film strip.

My improved single lens wheel rectifying system is equally applicable to 16 millimeter film and to double width film.

Having thus fully described my invention, what I claim is,

1. In an optical rectifying system, the combination of a stationary lens system, a plurality of identical refracting elements each having refracting surfaces substantially symmetrical about its optical axis, a rotatable wheel whereon said refracting elements are rigidly and symmetrically mounted, said wheel being conically formed, and positioned and oriented with respect to said stationary lens system, substantially as specified, to cause the optical centers of said refracting elements to cross the straight axis of said stationary lens system at right angles at one position on their orbit, and to pass said straight axis with a prescribed clearance at the opposite position on said orbit upon the rotation of said wheel, and means for rotating said wheel.

2. In an optical rectifying system, the combination of a stationary lens system, a plurality of identical refracting elements each having refracting surfaces substantially symmetrical about its optical axis, a rotatable wheel whereon said refracting elements are rigidly and symmetrically mounted, said wheel being conically formed, and positioned and oriented with respect to said stationary lens system, substantially as specified, to cause the principal plane of each of said identical refracting elements to cross the straight axis of said stationary lens system at right angles at one position on their orbit, and to form an angle other than 90 degrees with said straight axis at the opposite position on said orbit upon the rotation of said wheel, and means for rotating said wheel.

3. In an optical rectifying system, the combination of a stationary lens system, a plurality of identical rectifying lens elements each having refracting surfaces substantially symmetrical about its optical axis, a rotatable lens wheel whereon said lens elements are rigidly and symmetrically mounted, said lens wheel being conically formed, and positioned and oriented with respect to said stationary lens system, substantially as specified, to cause the axis of each of said rectifying lens elements to coincide with the straight axis of said stationary lens system at one position on their orbit, and to intersect the straight axis of said stationary lens system at one point for all other positions of said rectifying lens elements on said orbit upon the rotation of said lens wheel, and means for rotating said lens wheel.

4. A rotatable lens wheel having a plurality of identical lens elements arranged symmetrically about its periphery in conical formation, the optical centers of said identical lens elements lying in a plane perpendicular to the axis of rotation of said lens wheel, the optical axes of said identical lens elements intersecting at a common point on the axis of rotation of said lens wheel but not in the plane of said optical centers.

5. In a moving picture device, an optical rectifying system comprising a stationary optical element and a single rotating wheel provided with a plurality of identical rectifying elements fixed symmetrically on the periphery thereof in conical formation substantially as and for the purpose specified.

6. In a moving picture device, an optical rectifying system comprising a stationary optical element and a single rotating lens wheel provided with a plurality of identical rectifying lens elements fixed symmetrically on the periphery thereof in conical formation substantially as and for the purpose specified.

7. In a revolving lens wheel, the combination of a flange having a conical surface, a plurality of flange sections each provided with a conical clamping surface, and a plurality of rectifying elements, each having a projecting portion shaped to fit on said flange and under one of said flange sections, said rectifying elements being contoured to fit into the general conical structure.

8. In a revolving lens wheel, a plurality of identical rectifying lens elements rigidly mounted on the periphery thereof in conical formation substantially as specified, said rectifying lens elements each having spherical surfaces of unequal curvature, said unequal curvature being required to bend said lens elements to conform optically to the curvature of the circle whereon the optical centers of said rectifying lens elements are positioned on said lens wheel.

9. In a moving picture device, the combination of an optical rectifying system comprising a stationary optical element and a single rotating lens wheel having a plurality of identical rectifying lens elements arranged around the periphery thereof in conical formation, an aperture unit, a power driven sprocket mounted on said aperture unit, and means for actuating said sprocket in synchronism with said rotating lens wheel in a manner whereby a film strip in engagement with said sprocket may be advanced over said aperture unit a distance equal to the height of one film frame while said rotating lens wheel has turned through the angle subtended at the center of said lens wheel by one of said rectifying lens elements.

10. In a device of the character specified, the combination of a lens wheel shaft, a lens wheel fast mounted thereon and provided with a plurality of identical rectifying lens elements arranged about the periphery thereof in conical formation, a stationary optical element having its axis in the plane of the axis of said lens wheel shaft and at an acute angle thereto, a gear fast mounted on said lens wheel shaft, a second gear meshing with said gear fast mounted on said lens wheel shaft, a second shaft whereon said second gear is mounted, a third gear fast mounted on the opposite end of said second shaft, a fourth gear meshing with said third gear, a third shaft whereon said fourth gear is mounted, said third shaft being at an angle to said lens wheel shaft because of said conical formation, an aperture unit wherein said third shaft is journaled, and a sprocket fast mounted on said third shaft and arranged to advance a film strip over said aperture unit a distance equal to the height of one film frame while said lens wheel turns through the angle subtended at the center of said lens wheel by one of said rectifying lens elements.

11. As a component part of a rotatable conically formed lens wheel of the character specified, an optical rectifying element having two refracting surfaces, each substantially symmetrical about the optical axis of said rectifying element, said rectifying element being provided with an integral projecting portion, said integral projecting portion lying within the confines bounded by extending said refracting surfaces, and being precisely ground to fit securely into the conical clamping means provided on said lens wheel.

12. In an optical rectifying objective, a single stationary front component and a single rotatable lens wheel carrying upon its periphery a plurality of identical rectifying lens elements, said lens wheel being formed conically and positioned to cause each of said rectifying lens elements to function successively, upon the rotation of said lens wheel, as the rear component of said objective, the focal length of said front component being of the same order of magnitude as the focal length of each of said rectifying lens elements.

ARTHUR J. HOLMAN.